US012699754B1

(12) United States Patent
Astwood et al.

(10) Patent No.: US 12,699,754 B1
(45) Date of Patent: Aug. 4, 2026

(54) EMERGENCY DEVICE ACCESS FOR COMPANIONS

(71) Applicant: UIPCO, LLC, San Antonio, TX (US)

(72) Inventors: Paul Joseph Astwood, San Antonio, TX (US); Steven Michael Bernstein, San Antonio, TX (US); Janell Guzman, Boerne, TX (US); Gregory David Hansen, Fuquay Varina, NC (US); Nina Schuessler, San Antonio, TX (US); Kristina Suniga Cabrera, San Antonio, TX (US); Mounica Urity, Mountain View, CA (US)

(73) Assignee: United Services Automobile Association (USAA), San Antonio, TX (US)

( * ) Notice: Subject to any disclaimer, the term of this patent is extended or adjusted under 35 U.S.C. 154(b) by 72 days.

(21) Appl. No.: 18/817,634

(22) Filed: Aug. 28, 2024

Related U.S. Application Data

(60) Provisional application No. 63/579,311, filed on Aug. 29, 2023.

(51) Int. Cl.
*G06F 21/31* (2013.01)
(52) U.S. Cl.
CPC .................................... *G06F 21/31* (2013.01)

(58) Field of Classification Search
CPC ...................................................... G06F 21/31
See application file for complete search history.

(56) References Cited

U.S. PATENT DOCUMENTS

| | | | | |
|---|---|---|---|---|
| 9,147,054 B1 * | 9/2015 | Beal | ......................... | G06F 21/32 |
| 2009/0165125 A1 * | 6/2009 | Brown | .................... | G06F 21/31 |
| | | | | 726/21 |
| 2015/0209676 A1 * | 7/2015 | Tsuchiya | ................. | A63F 13/71 |
| | | | | 463/29 |
| 2019/0311102 A1 * | 10/2019 | Tussy | .................... | G06V 40/67 |

* cited by examiner

*Primary Examiner* — Theodore C Parsons
(74) *Attorney, Agent, or Firm* — Plumsea Law Group, LLC

(57) ABSTRACT

A method and system for managing and enabling emergency access to critical data. The embodiments provide a system that authenticates companions of a owner of a computing device following a secure enrollment process in which companion data and authentication factor are stored. An app installed on the computing device can then be used to perform authentication of the companion and then allow access to limited features linked to their stored data. In some embodiments, the app can allow the companion to access their information such as emergency contacts and payment details, as well as some features of apps for which they had previously stored their credentials.

20 Claims, 12 Drawing Sheets

T3

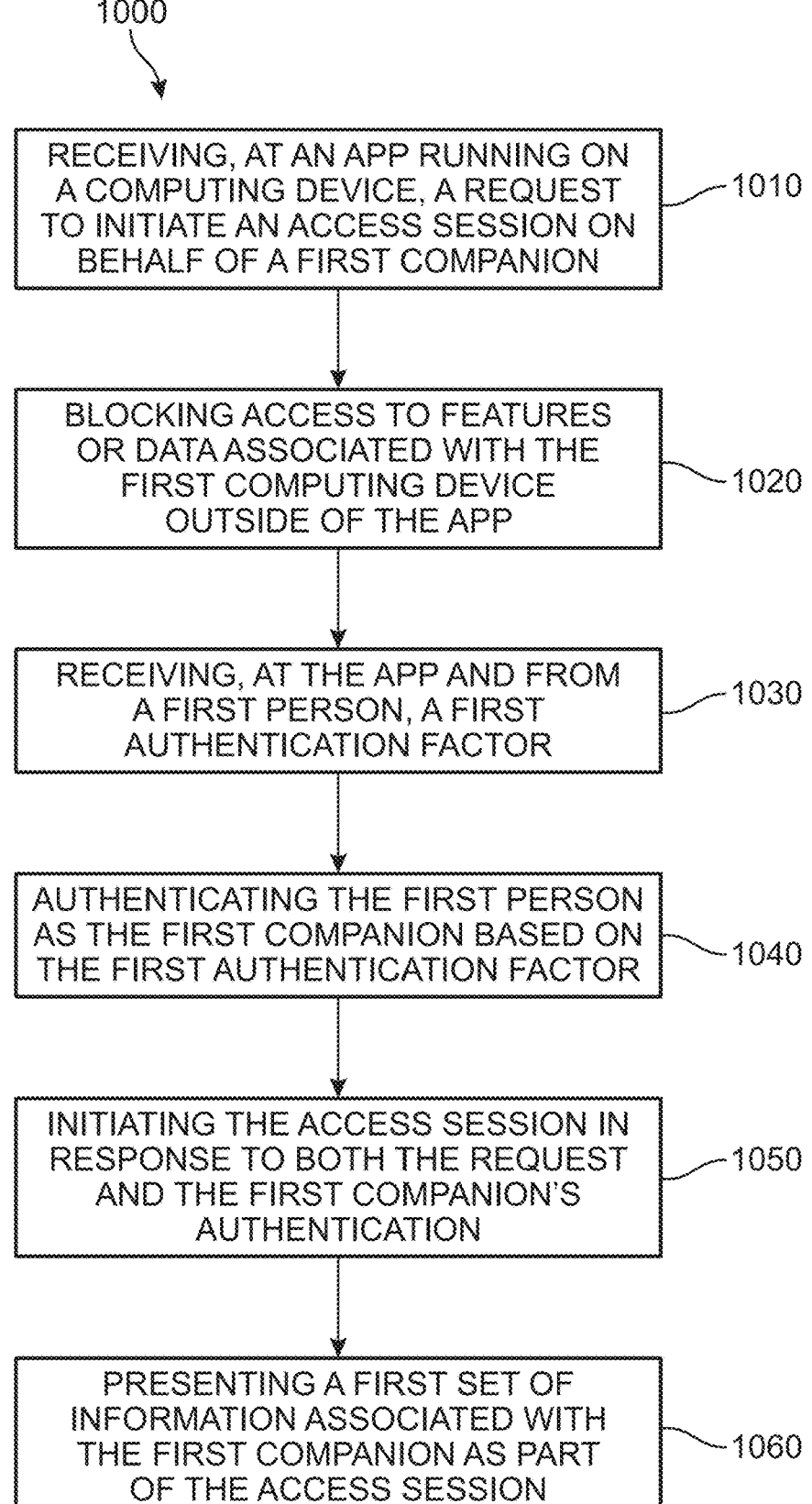

1000

RECEIVING, AT AN APP RUNNING ON A COMPUTING DEVICE, A REQUEST TO INITIATE AN ACCESS SESSION ON BEHALF OF A FIRST COMPANION ⟶ 1010

BLOCKING ACCESS TO FEATURES OR DATA ASSOCIATED WITH THE FIRST COMPUTING DEVICE OUTSIDE OF THE APP ⟶ 1020

RECEIVING, AT THE APP AND FROM A FIRST PERSON, A FIRST AUTHENTICATION FACTOR ⟶ 1030

AUTHENTICATING THE FIRST PERSON AS THE FIRST COMPANION BASED ON THE FIRST AUTHENTICATION FACTOR ⟶ 1040

INITIATING THE ACCESS SESSION IN RESPONSE TO BOTH THE REQUEST AND THE FIRST COMPANION'S AUTHENTICATION ⟶ 1050

PRESENTING A FIRST SET OF INFORMATION ASSOCIATED WITH THE FIRST COMPANION AS PART OF THE ACCESS SESSION ⟶ 1060

FIG. 10

EMERGENCY DEVICE ACCESS FOR COMPANIONS

CROSS-REFERENCE TO RELATED APPLICATION

This application claims the benefit of U.S. Provisional Patent Application Ser. No. 63/579,311 filed on Aug. 29, 2023 and titled "Emergency Device Access for Companions", the disclosure of which is incorporated by reference herein in its entirety.

TECHNICAL FIELD

The present disclosure generally relates to providing access to critical information and resources during an emergency, and in particular to a mechanism by which a person can access their pre-stored information and apps via a mobile device belonging to another person.

BACKGROUND

Cellular phones or other communication devices—along with the information and apps stored on them—are sometimes lost or stolen. Furthermore, in scenarios where a person is in away from their home, it can be difficult to pull together the resources needed to accommodate this type of loss. In such cases, the affected person can become vulnerable, isolated, and/or unable to reach loved ones or conduct critical tasks, particularly in today's cell phone-dependent society. Replacing such items or simply being able to access critical information without a stressful, convoluted process of cancelling their previous phone, purchasing and activating a new phone, and restoring their data becomes an onerous challenge.

There is a need in the art for a system and method that addresses the shortcomings discussed above.

SUMMARY

In one aspect, a computer-implemented method of providing authorized users limited access to a computing device. The method includes a first step of receiving, at a companion access application running on a first computing device and at a first time, a first request to initiate a companion access session on behalf of a first companion and a second step of blocking, by the companion access application and in response to the first request, access to features or data associated with the first computing device outside of the companion access application in order to protect the data of the device owner. In addition, a third step includes receiving, at the companion access application and from a first person at a second time after the first time, a first authentication factor and a fourth step of authenticating, via the companion access application, the first person as the first companion based on the first authentication factor. In addition, a fifth step includes initiating, by the companion access application, the companion access session in response to both the first request and the first companion's authentication, and a sixth step includes presenting, via the companion access application, a first set of information associated with the first companion retrieved from a companion repository.

In another aspect, a computer-implemented method of providing authorized users limited access to a computing device is described. The method can include a first step of receiving, at a companion access application running on a first computing device and at a first time, a first request to initiate an enrollment session of a first companion, and a second step of automatically blocking, by the companion access application and in response to the first request, standard access to features or data associated with the first computing device outside of the companion access application. The method also includes a third step of receiving, at the companion access application and from the first companion at a second time after the first time, a first authentication factor, and a fourth step of automatically storing the first authentication factor in a record linked to the first companion. Furthermore, the method includes a fifth step of receiving, at the companion access application, a first set of information including one of emergency contacts, payment details, and credentials for a first app, a sixth step of automatically storing the first set of information in the record, and a seventh step of receiving, at the companion access application and from an owner of the first computing device at a third time after the second time, a second authentication factor. In addition, the method includes an eighth step of authenticating, via the companion access application, the owner based on the second authentication factor, and a ninth step of unblocking, in response to the authentication, standard access to features or data associated with the first computing device outside of the companion access application.

In another aspect, a system for providing authorized users limited access to a computing device is disclosed. The system comprises a processor and machine-readable media including instructions which, when executed by the processor, cause the processor to (1) receive, at a companion access application running on a first computing device and at a first time, a first request to initiate a companion access session on behalf of a first companion; (2) block, by the companion access application and in response to the first request, access to features or data associated with the first computing device outside of the companion access application; (3) receive, at the companion access application and from a first person at a second time after the first time, a first authentication factor; (4) authenticate, via the companion access application, the first person as the first companion based on the first authentication factor; (5) initiate, by the companion access application, the companion access session in response to both the first request and the first companion's authentication; and (7) present, via the companion access application, a first set of information associated with the first companion retrieved from a companion repository.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a flow chart depicting a process of providing authorized users limited access to a computing device, according to an embodiment.

DETAILED DESCRIPTION

Figure 1:
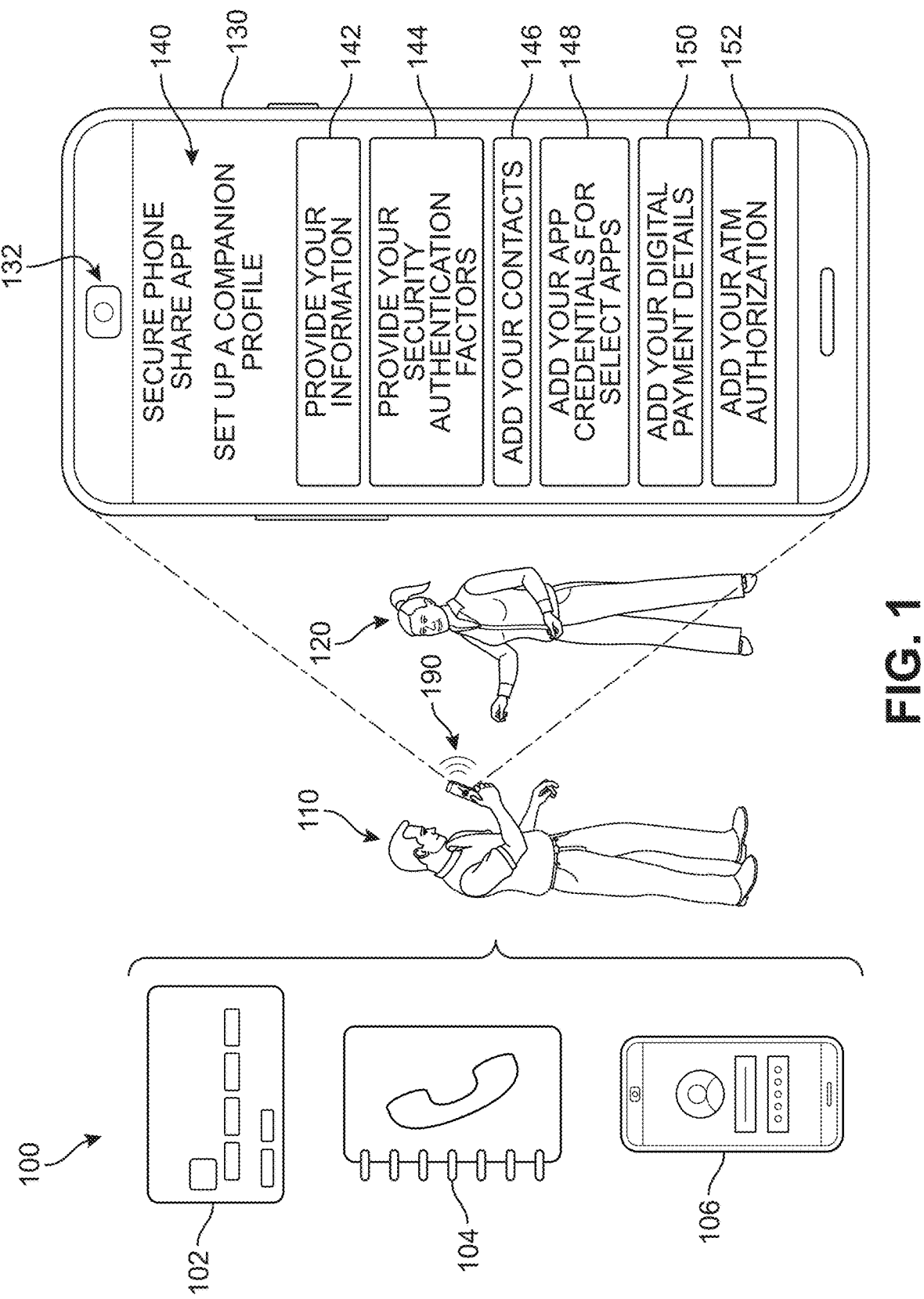
FIG. 1 depicts an example of an enrollment session of a companion of a first person to enable access to a computing device owned by the first person, according to an embodiment.

The proposed embodiments describe a system and method for providing users a mechanism by which to access critical information and services via a companion computing (e.g., cellular) device. Such access can be permitted following some type of theft or other loss of their own computing device, or can simply be enabled for persons who do not carry a portable computing device but are traveling with a person who does carry a portable computing device. In some embodiments, the proposed embodiments allow companions to enable private and secure use of their phone by their traveling companion who may have lost their phone while traveling. This can be desirable as, in many cases, persons will travel abroad with their spouse or a travel companion. In those instances when travel occurs with a companion, the proposed systems can allow each traveler to set up their phone for use by the other person in a private and secure way if one of the travelers loses their phone during the trip.

In different embodiments, the disclosed embodiments enable one computing device (e.g., belonging primarily to a first user) to provide a range of services and features that would be made available to their companion (e.g., a different, second user). In some embodiments, certain features would require submission of personally identifiable information (PII) from the companion. For example, the setup procedure that could occur would allow the companion to enter as much or as little information as they want, corresponding to the features they want enabled during emergency use. In different embodiments, the features available during emergency use can include data and services that fall under categories of: (1) simple communications, (2) digital payments, (3) ATM access, and/or (4) app usage.

As a general matter, the first category ((1) simple communications) can refer to messages that the companion could send using the member's device. In some embodiments, the system could be pre-configured to send either e-mails or text messages using a general sender address (e.g., "Emergency-Message-from-Greg@USAA.com") to pre-stored e-mail addresses associated with the companion's profile. In some embodiments, the system could then also allow e-mail recipients to reply to that temporary e-mail address for review at the phone device that is being borrowed. Similarly, the second category ((2) Digital Payments) can include features that would allow the companion to use the member's phone as a digital payment device. For example, the companion could pre-store their credit card information on the member's phone for use during an emergency. This would allow the companion to use the member's phone like it was their own phone during an emergency.

Furthermore, the third category ((3) ATM access) could allow the primary user's phone to be used by the companion to obtain cash from their own account, e.g., via an ATM or cash-back device. Finally, the fourth category ((4) app usage) would generally allow the companion to pre-load specific apps, such as travel apps like Uber®, Lyft®, United Airlines®, or other traveler-essential service providers, etc. Thus, in some embodiments, the companion could store their travel app or other app information in the primary user's phone for their own secure use during emergencies.

It should be appreciated that in order to successfully provide such an exchange of data using the same device, privacy and security become extremely important features. Thus, in different embodiments, the proposed system would be configured to "lock down" access to the information or data on the primary user's phone during the initial setup and subsequent use sessions by the companion. For example, the companion would not be able to see or access any of the primary user's contacts, messages, photos, data, or payment information during either the setup or any of their use sessions. In some cases, the features of the proposed system can be provided via an app on the primary user's phone that would provide functionality to the companion while the phone remained in a locked state so that the companion would be completely prevented from accessing the member's phone during their emergency use.

For purposes of introduction, an overview of one embodiment of the proposed systems and methods is illustrated with reference to FIG. 1. FIG. 1 depicts an example of a companion access enrollment process ("enrollment") that can be implemented to setup a primary user's phone for later access by an authorized secondary user (companion). For purposes of this example, a first person 120 (the primary user) is shown handing off their first computing device ("first device") 130 to a second person 110 such as their spouse (secondary user). A first companion access app ("companion app") 140 that has been loaded onto the first device 130.

In different embodiments, the first device 130 includes one or more processors and memory. Memory may comprise a non-transitory computer readable medium. Instructions stored within memory may be executed by the one or more processors. First device 130 may also include one or more communication components. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, Wi-Fi, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

The scenario of FIG. 1 depicts an example by which the first person 120 has authorized and opened the companion app 140 on their phone, and selected the registration of a new profile. They then pass the first device 130 to their spouse. In some embodiments, the second person 110 can then manually enter specific data or details they want stored, or the companion app 140 can offer various options to facilitate the submission and security of the companion's data. In some embodiments, the companion app 140 can, in response to the request for the secondary user's enrollment, present a series of fields and/or questions by which the user submits the information they wish to store in the app locally, or for storage in a remote database that can be accessed later over a network. For example, a user data submission process can be provided by an enrollment module (e.g., see FIG. 2) that can present a "walkthrough" user interface by which the user is asked to enter information for different categories. An example of this is shown in FIG. 1, where the companion app 140 presents a plurality of data submission options 190, such as a first option 142 to provide/input their personal information (e.g., name, address, health insurance, documents, driver's license data, etc.), a second option 144 to provide/input their security authentication factors such as but not limited to the creation of or auto-generation of a secure username/password, biometric data (e.g., collected via camera 132), etc., a third option 146 to provide/input the contacts they want access to, a fourth option 148 to provide/input their desired apps and corresponding app login credentials, a fifth option 150 to provide/input their payment credentials for their virtual credit card and/or pay services such as PayPal®, Venmo®, Zelle®, CashApp®, or other payment services, and a sixth option 152 to provide/input their ATM/debit card credentials for enabling electronic access to their bank or other accounts. In this example, the second person 110 selects options related to their payment details (and enters their credit card account data 102), their contacts (and enters their emergency contacts 104), and their desired apps (and enters their app credentials 106). In addition, the second person 110 creates/memorizes a password and/or provides some other authentication factor for the system to recognize him in the future and grant access to their information 100.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password/code or PIN; (b) user possession, typically provided by the secured system service, such as a physical key, smart card, CAC (Common Access Card), PIV card (Personal Identity Verification card), RSA, or other tangible card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments make use of non-tangible factors that include (a) and (c), and can exclude (b), ensuring that the loss of such physical items will not prevent the user from accessing the emergency resource. Each of these input types comprising data that is used to verify the user's identity will collectively be referred to as an authentication factor in this description.

Furthermore, authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, kiosks, lockers, vaults, offices, or other spaces with specific security requirements. In addition, the use of the term "secured resources" or "critical data" refers to services, features, or other resources (physical and digital or virtual) that are access-restricted and are designed to be made available only to users that have been authenticated and authorized for such access.

Figure 2:
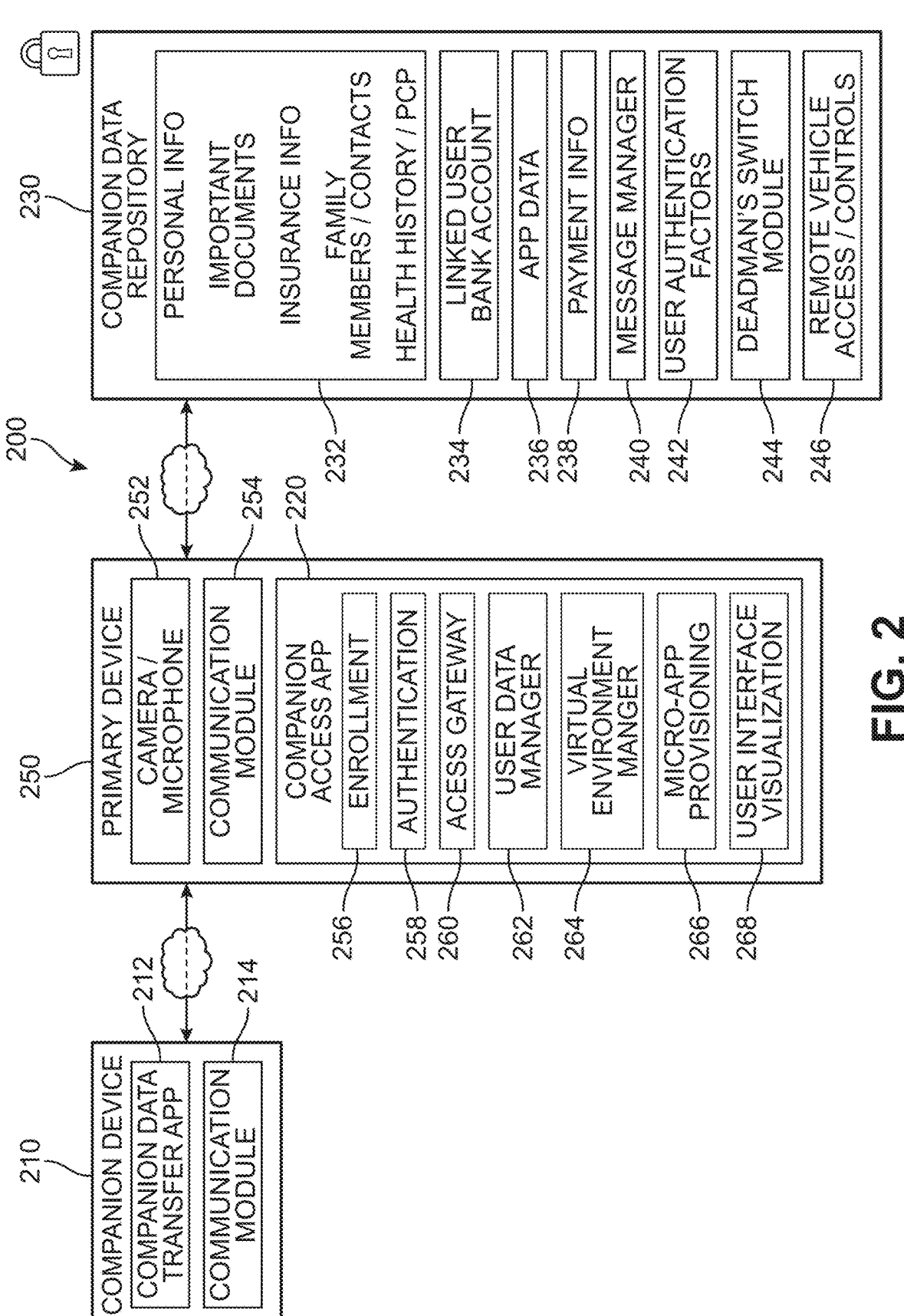
FIG. 2 shows a schematic diagram of an environment for a companion access management system, according to an embodiment.

In order to provide the reader with a greater appreciation of the embodiments, FIG. 2 depicts an example of an environment 200 in which an embodiment of a companion data access system ("system") can be implemented. It should be understood that the environment 200 is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIG. 2.

As shown in FIG. 2, the environment 200 includes a primary computing device ("primary device") 250 that can be in communication with a secure remote (server) companion data repository and manager ("repository") 230. In some optional embodiments, environment 200 can also include a companion computing device ("companion device") 210. It should be understood that the term "computer device" or "computing system" refers to the computing resources of a single computer, the partial computing resources of a single computer, a plurality of computers communicating with one another, or a network of remote servers. In one embodiment, a computer device includes at least one server having at least one processor.

In different embodiments, devices and components of environment 200 can communicate with each other and with other components of environment 200 over one or more networks (depicted here schematically by cloud-shaped icons). A network 290 may comprise any number of electronic devices and use any number of communication protocols to facilitate data communications within the network 290. One having skill in the art would appreciate that the network 290 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

Furthermore, while some of the various components of environment 200 are shown as residing in primary device 250, companion device 210, and/or repository 230 in FIG. 2, in other embodiments some or all components or modules described herein are accessed through a cloud network and/or stored on a cloud-based server, or components are assigned to different modules. Thus, in different embodiments, companion access app 220 or components thereof can be hosted on a server and accessed remotely by the primary device 250, rather than being locally stored on the primary device 250. Conversely, some or all of the components of repository 230 can be stored directly on the primary device 250, such that most if not all operations can be performed even without access to a network connection. Similarly, in some embodiments, companion access app 220, repository 230 and/or components thereof may be integrated into a single system. In different embodiments, the various modules of the environment 200 can be understood to comprise a cloud-based server and may include computing devices comprising any number of components, such as a Network Interface Card (NIC), allowing the respective devices to receive, transmit, process, and store information from external computing systems. In other words, the environment 200 may include groups or subgroups of computing devices that can communicate with each other, but not necessarily with the computing devices in other groups or subgroups. The environment 200 may include computing devices of disparate types, having different types of hardware and software configurations and in a variety of different locations. In some cases, multiple devices or subsystems can be identified together as a single computing device. In different embodiments, the modules of environment 200 including but not limited to primary device 250, companion device 210, and repository 230 may each include one or more processors, non-transitory machine-readable storage media, and a data communication interface (e.g., NIC card), as well as user interface devices, for example, a monitor, touchscreen, mouse, or keyboard.

In different embodiments, the repository 230 can refer to a content library that stores account data related to one or more users (companion information 232). This data may include, for one or more designated companions, a name, personal and professional details, user biometric data and other PII, current and past insurance policies' history for the user, family data including emergency contact information, essential vehicle information, car insurance information, health insurance information, user health information including health history and preferences and/or living will, primary care providers, treatment plans, prescriptions, designated service providers (e.g., the names of their preferred hospital, doctor, mechanic, towing agency, pharmacy, lawyer, etc.) among other details. In some embodiments, important documents can also be uploaded for secure storage, such as copies of passports, driver's licenses, or other identification cards, contracts, photos, etc.

Furthermore, in different embodiments, the repository 230 can include the companion's linked bank account information 234 that will allow them to trigger access to their bank account funds via a partner ATM service provider (e.g., a bank or credit union, or a cash-back point-of-service device), a secure payment information 238 (e.g., Venmo™, Zelle®, CashApp®, credit card details, PayPal™, etc.) that can be used to complete transactions using the primary device, a message manager 240 for communicating to different third parties (e.g., using an email or text micro-app service, for example), and an app data pool 236 that stores log-in credentials for each of the companion's designated apps (e.g., travel-based apps, payment apps, bank apps, etc.), in some embodiments, the companion's authentication factors 242 can also be stored in the repository 230, including but not limited to biometric records that can be used to determine if a person should be granted access to the companion data. Furthermore, in some embodiments, the repository 230 allows the companion to provide vehicle data/signals and app credentials that can be used in conjunction with a remote start or virtual key application 246 to enable access/control of their vehicle even if their belongings have been stolen or lost (i.e., including their phone and keys). Such apps can offer users the ability to control features of their vehicle, beyond locking and unlocking a car; features that can be enabled via such an app could be used to start the car remotely, release the hatch or trunk, and signal a panic alert in the event of an emergency. Some non-limiting examples of a vehicle control hub app include the Virtual Key®, CarChabi®, Phone As A Key®, Mobokey®, and any other app that facilitates vehicle access. Finally, in some optional embodiments, the repository 230 can include a deadman's switch module 244. Such a module would allow the companion to have access to a control that would cause the display of the primary device's phone number and a message in case the companion phone was lost and found by someone who wishes to return it, and/or trigger a remote wipe of all of the companion phone data and/or encrypt and lock the companion phone. In some other embodiments, the deadman's switch module 244 will wipe the companion's own data that is stored in the repository 230 if the companion does not 'check in' at the primary device within a pre-designated interval. For example, the companion (or primary user) can select a once-a-month check in (or some other frequency, such as daily, weekly, yearly, etc.) where the companion must provide their authentication factor(s) or the companion access system will automatically delete or remove the companion's stored information from the repository 230. Such a functionality can greatly improve the security of the data, particularly in cases where the companion has a 'falling out' with the primary user, or the two people are separated, and/or the primary device 250 itself is lost or stolen.

Thus, in different embodiments, once the companion logs into the companion access app, it can immediately provide useful functions, like the ability to tap and pay, and use travel and rideshare apps like Uber® and Lyft®, without further authentication. The companion data import or availability process is intended to work so that the companion is able to access one or more of their installed apps and payment details without additional inputs or identification. In one example, the primary device 250 can be configured to operate to some extent like the companion's lost phone seamlessly. In some optional embodiments, the companion must use some type of biometric data in order to be fully authenticated and permit access to their information.

In different embodiments, a primary user can download or otherwise access the companion access app 220 via the primary device 250 in a manner similar to their usage of other apps that may be used on the primary device 250. In addition, as a general matter, primary device 250 can include provisions for communicating with, and processing information from, a server as well as other devices, represented in FIG. 2 as a first communication module 254. It may be appreciated that different devices could communicate using different networks and/or communication protocols. For purposes of this disclosure, a communication protocol refers broadly to any type of communication system that enables wireless communications to/from a mobile device. The communication module 254 may include a wireless connection that implements or includes components providing one or more communication protocols such as Bluetooth® radio technology, communication protocols described in IEEE 802.11 (including any IEEE 802.11 revisions) such as Wi-Fi, as well as communication protocols that rely on cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections. Thus, each device may include a communication system such as a radio or other provisions for communicating using one or more communication methods. In particular, the communication system includes provisions for communicating with other nearby devices and/or a server over a network. For example, each communication system could include a Wi-Fi radio, a Bluetooth radio, and/or a cellular network radio. Furthermore, the primary device 250 and companion device 210 may each further include one or more processors and memory. Memory may comprise a non-transitory computer readable medium. Instructions stored within memory may be executed by the one or more processors.

As noted earlier, in some embodiments, an end-user can interact with the proposed systems and stored data via the companion access app 220, also referred to more simply as "app" 220 or "mobile app" 220 herein. In some embodiments, some or all components and features of the mobile app 220 can be downloaded to be accessible locally on the device. In other embodiments, some or all components and features can be accessed via a web-based service over a network. The mobile app 220 can offer an enrollment module 256 for facilitating the creation and management of a primary user profile and one or more companion user profiles (e.g., see FIG. 1). In some embodiments, the information is submitted directly by the companion into the primary device 250. In another example, their own device (e.g., companion device 210) can be used to transfer data directly to the companion access app 220 running on the primary device 250. In some embodiments, the system can include a companion data transfer app 212 that can be downloaded at the companion device 210 and can facilitate and/or manage the transfer of selected data, via a second communication module 214 and over network 290, from the companion device 210 to companion access app 220 at the primary device 250.

In addition, there may be multiple companion-user profiles that can be created at a single primary device, where each profile can allow each individual companion to modify their own settings, preferences, etc. and view their app activity/history. In some embodiments, the user's submitted data can be stored locally or and/or at the remote server such as repository 230. This data can further include app-related user-specific information such as user preferences, such as but not limited to the primary user's selected switchover event preferences (i.e., what type of data should cause the system to present the option to shift to a companion mode), the primary user's desired reversion preferences (i.e., what type of data should trigger the system to return to standard device mode), primary user permissions to identify which types of inputs are allowed to be submitted by the companion.

Primary device 250 can also include or otherwise be in communication with one or more sensor devices ("sensors") 252. Some non-limiting examples of such sensors include, but are not limited to, image sensors, microphone or other audio sensors, capacitive sensors, motion sensors, heat sensors, location data, infrared (IR) sensors, time-of-flight (TOF) sensors, and/or ultrasonic sensors. In other words, there are a variety of sensors that may be configured to collect data that can be related to the authentication of the companion and/or primary user, and as mobile devices become more advanced, additional types of sensor data may become available. The onboard sensor device can then be used to both collect the initial authentication factor data (e.g., the reference record) such a retinal scan, fingerprint, infrared face scan, etc., and also be used to perform the subsequent data collection for purposes of authentication in conjunction with the app's authentication module 258.

In different embodiments, authentication module 258 works with an access gateway manager ("access gateway") 260 to evaluate captured biometric data and determine whether access should be granted. In some embodiments, authentication module 258 includes a match determination module that implements biometric authentication technology, compares the captured biometric data to stored, confirmed authentic data (reference biometric data) that can be accessed from the repository 230. In some cases, authentication is performed remotely.

In general, the terms biometric signal or biometric data refer to an identifier that is associated or linked to an individual human and serve as a reliable authentication factor. The biometric signal can be stored in a database and represent or be included in an authentication record that will be linked to the account of the person (including identification data) who participated in an identity verification training session (e.g., during an enrollment session provided via the companion access app 220), and be made available for use by the system during subsequent authentication sessions. In general, biometric authentication works by comparing two sets of biometric data of the same biometric data type (e.g., retinal scan to another retinal scan, fingerprint to another fingerprint of the same finger, etc.), where the first one is preset by the companion of the primary user, while the second one belongs to a person requesting access to the companion's account. A match determination module can make a decision, such that if the two sets of data match, the user can be authenticated. The authentication is shared with access gateway 260, which can then allow the secure transmission of data to occur.

In different embodiments, image signal processing algorithms and/or software may be accessed by the authentication module 258, for example when performing facial recognition. In one example, the image input can be cleansed and normalized by an image processing module. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual or haptic signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur. Thus, a real-time authentication factor such as a fingerprint, eyeprint/retinal scan can be compared to a previously acquired fingerprint (or eye) authentication template (biometric reference models).

In some embodiments, the captured biometric data is processed and models or representations of the image are built. These models are compared against one another. In different embodiments, one or both samples may be deemed unacceptable or unusable if the resultant input is too bright or too dark, or if there is too much noise (poor signal to noise ratio). If a sample is not acceptable the system may request an additional or further sample. If the data is acceptable or sufficient, a scoring occurs via the authentication module 258. In one example, the scoring process is analogous to "what is the probability that the data captured by the primary device 250 are the same as the verification reference sample that is stored in the repository 230 (e.g., authentication factors 242)?" Thus, in some embodiments, the determination of a "match" is not necessarily based on the verification/reference sample directly or exactly matching, but rather on the two samples being substantially similar or sharing particular features. The returned score is evaluated against a threshold value to determine if it meets or exceeds the minimum acceptable score. If the score is determined to be successful, the process can continue. Otherwise, access is denied, or blocked pending further verification. In some embodiments, the system is configured to then automatically generate a message indicating an unauthorized attempt to access the service may have occurred. In some embodiments, this message can be automatically transmitted by a communication module to an account address for the registered user.

It can be appreciated that, in different embodiments, the user may opt to provide biometric updates at different intervals. For example, the user may lose or gain weight, have surgery, be in an accident, or experience some other change that may affect the validity of the biometric data as previously stored, and therefore he/she may request to submit new data at the companion access app 220.

In different embodiments, in response to authentication of the companion having been completed successfully, the access gateway 260 can proceed by generating an authorization signal via an authorization signal generator. The authorization signal generator passes a signal to the repository 230 that can trigger local access by the user to some or all data stored in their account.

In some embodiments, the companion can view and/or modify their inputted data, which can change over time, via a user data manager module ("data manager") 262, which can allow the companion to ensure their information is up to date and correct. In addition, in some embodiments, data manager 262 can also provide options by which the user can specifically define or select what information should be revealed in response to different levels of authentication. For example, the companion may store emergency contacts as well as credit card details, and then indicate that only the emergency contacts should be disclosed/shown via the app 220 if the password is correct but the biometric factors are not provided or are incorrect.

In different embodiments, once a companion is provided access to their information, the app 220 can present various options and data by way of a user interface visualization module 268 that can render the desired information and options in an interactive, secure environment. In some embodiments, the companion's resources, such as companion data 232 and credentials, bank information, payment details, message functions, remote vehicle controller, and designated apps, etc. can be provided by way of a virtual environment that is created or hosted via an in-app virtual environment manager 264, such as but not limited to features/services offered by Windows® App-V, MISIX®, Citrix®, ThinApp®, VMware®, Vultr®, Google® Compute Engine, Cloudpaging®, VirtualBox®, etc. In other words, the app 220 can be configured to run a locally installed application (e.g., Lyft®, etc.) in a virtual environment, alongside any other selected applications that have been virtualized or specific plug-ins that work with the application. For example, such an approach can allow the companion's applications to be deployed ("streamed") in real-time to any client from a virtual application server, and removes the need for traditional local installation of the applications on the primary device 250. In some embodiments, app 220 enables a centralized installation and management of deployed companion applications.

In some additional or alternative embodiments, the app 220 can include a micro-app provisioning module 266. In these cases where micro-apps or micro programs are used by the app 220, the micro apps may have limited functionality while allowing the companion user interact, perform some specific tasks, and leave the app with maximum efficiency. Micro apps can be desirable as they can provide precise features and make it very convenient—with significantly less drain on the resources of the primary device 250, to accomplish a task associated with the companion's app. In addition, micro apps can adopt the specific user interface for the particular use case. This means that the user interface is based on the specific need of the user. As a non-limiting example, a typical personal banking mobile app contains several features, like: (a) View the current balance, (b) Get mini statement, (c) Change the ATM pin, (d) Transfer money, (e) Show the last 5 transactions, etc. However, in order to bolster the companion's banking security and financial integrity, a micro app can be built and employed by the app 220 that enables only some of those features. For example, the micro banking app may instead perform only one specific task, like getting the current balance or changing the ATM pin. In another example, a micro app might allow you to book a plane ticket or track your daily steps, but not have the same access to other travel or health tracking features.

In many cases, micro apps are usually small in size because of their hyper-specialization, reducing the processing power and battery needed to power such an app. In some embodiments, the specific task or feature can be selected during enrollment by the companion. Thus, while a traditional mobile app contains many features that companions, at times of emergency, may not have any interest or use for, and which would cause performance issues such as high load times, sluggish performance, complex navigation and so on, the selection of a single functionality in a micro app would result in a seamless user experience, navigation, and better performance while enabling the companion access to their desired feature. As a general matter, each micro app can include three main components: an authentication layer that plugs into the larger app's identity and access management service provider (e.g., Auth0, Okta, Directory, Active, etc.), a CRUD (create, read, update, and delete) interface that interacts with the data source, database, and one or more available APIs hailing from SaaS and homegrown applications like employee time tracking software, and a notification layer that generates alerts whenever a certain criterion is met.

Thus, in different embodiments, app 220 can process a companion information access request and verify the companion's identity. If successfully authenticated, the app 220 can retrieve various companion information and preferences (e.g., stored in the repository 230 during enrollment or updated afterwards) over network 290. The app 220—and the primary device 250—then has access to the companion's various apps, passwords/credentials, contacts, preferences, layout, settings, and other parameters based on what was submitted to the repository 230. In other words, the app 220 can automatically create a virtual environment or bubble for use by the specific user (companion) in such a way so as to make the transition to the new phone seamless and allow the user to quickly take actions that would otherwise not been possible without physical credentials that they may have lost/had stolen. In one example, the companion can immediately begin to make phone calls or engage in messaging with their family/friends/colleagues, whose contact information they may not have otherwise have had access to following the loss of their original phone. Similarly, the user can engage in transactions with merchants using stored payment credentials that are now available via the primary device 250, arrange for travel and other services through apps that have been added and automatically logged in using the companion's credentials, which they may not have known by memory. Furthermore, their preferred search engine (and maps) and limited features of their email account can also be automatically included so that they can locate important documents or travel information.

Figure 3:
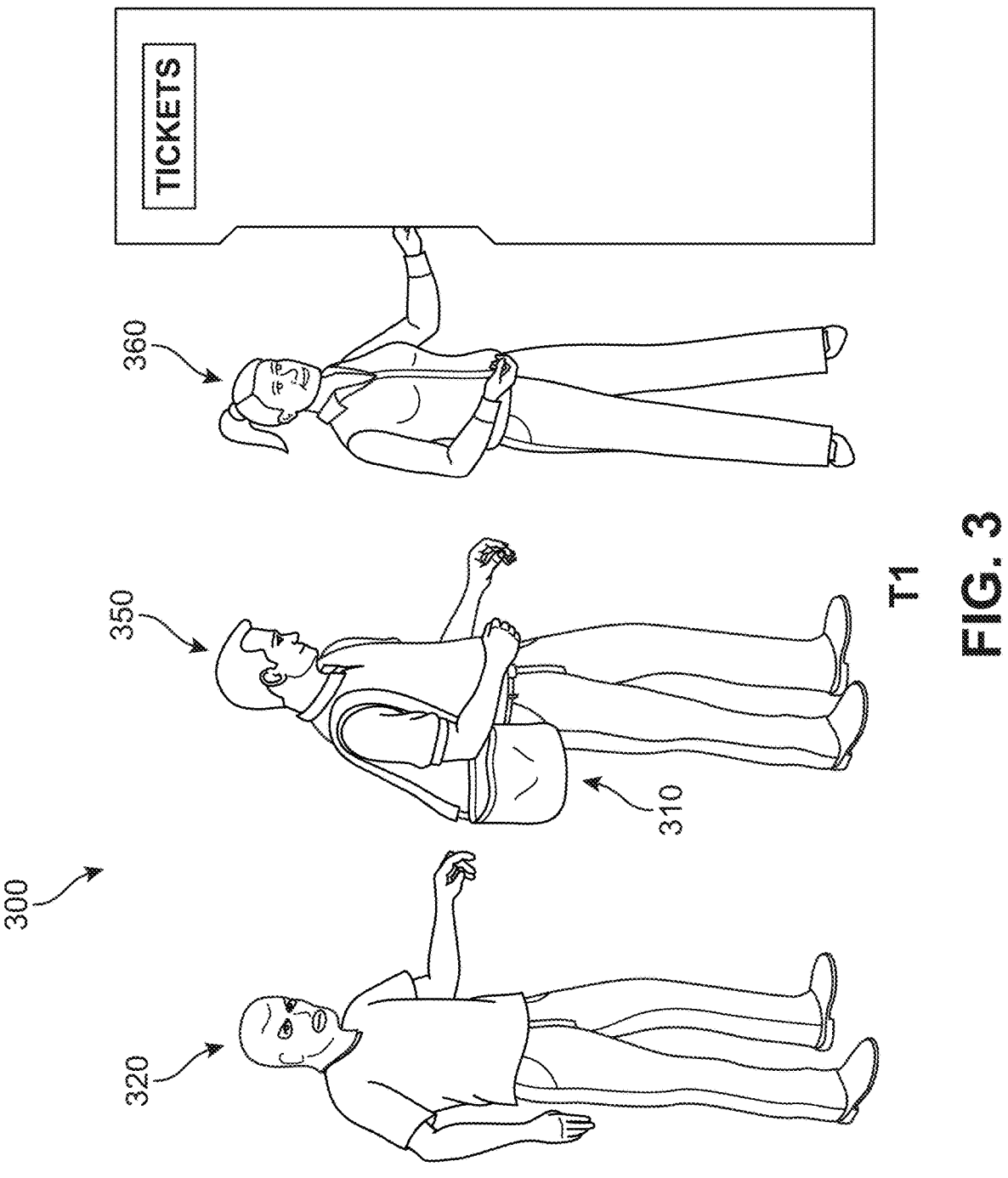
FIG. 3 is a representation of a companion being robbed of their valuables, according to an embodiment.
Figure 4:
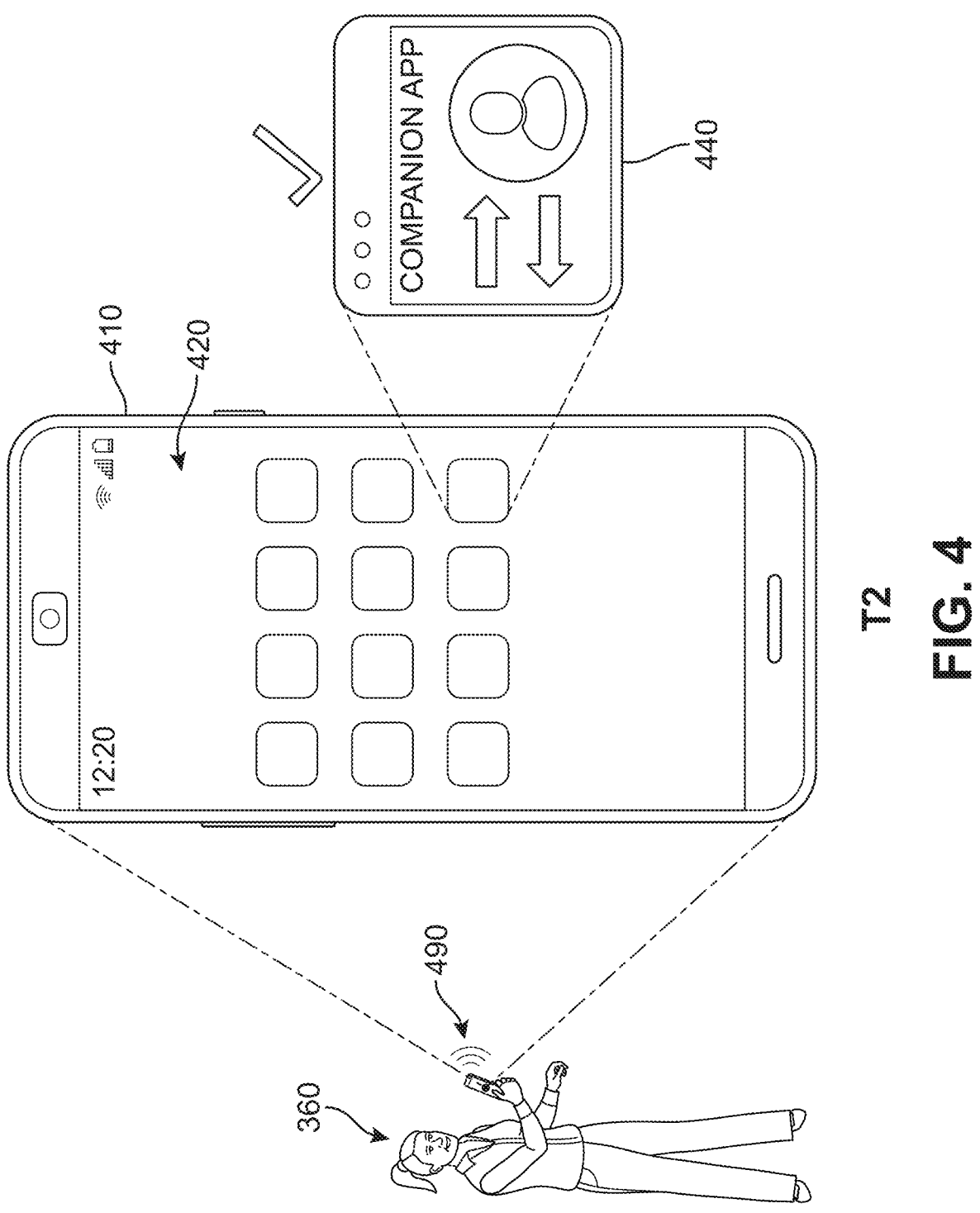
FIGS. 4 and 5 depict the primary owner of a mobile device requesting a switch to a companion access mode, according to an embodiment.
Figure 5:
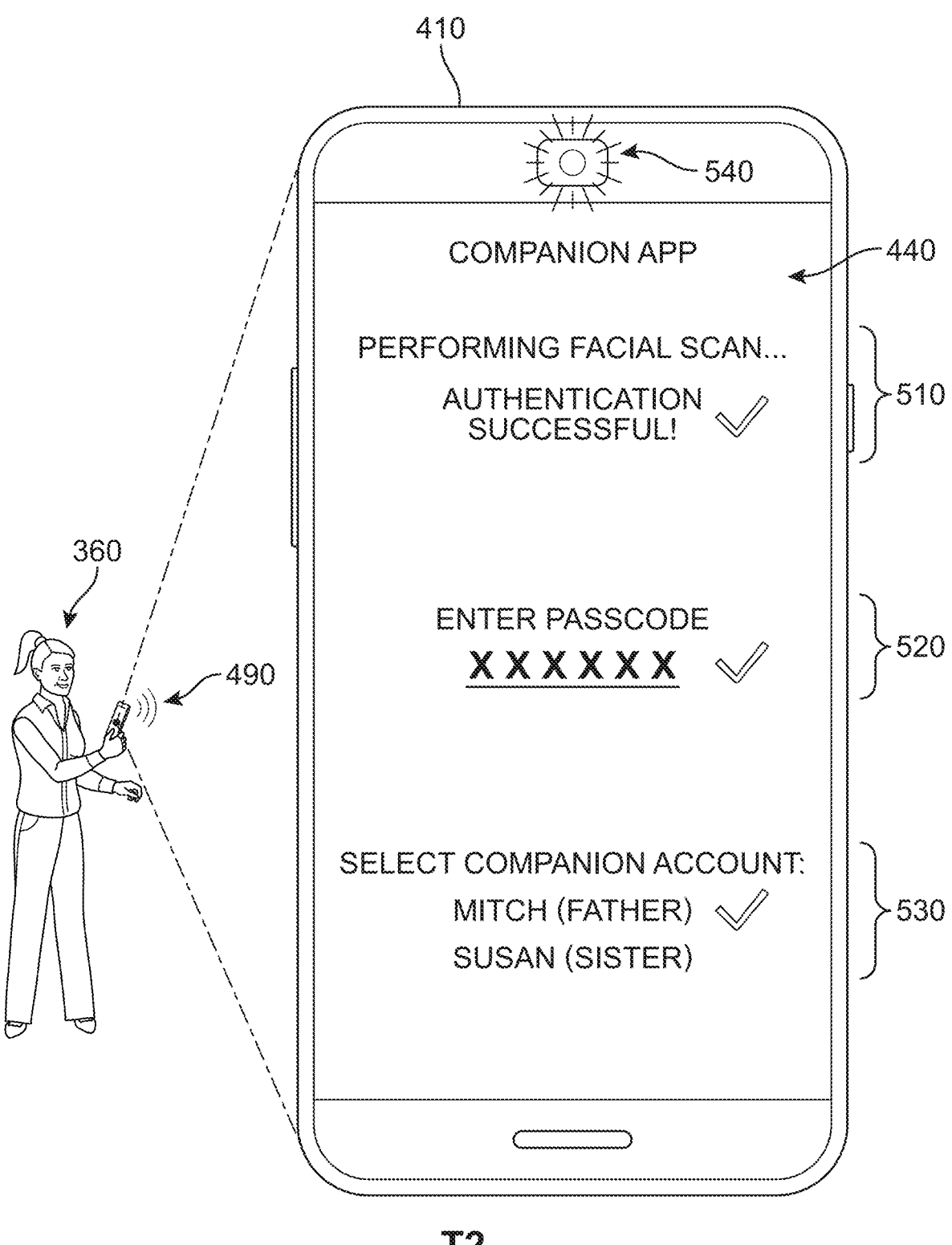

FIGS. 3-9B present a sequence of drawings illustrating a scenario in which an embodiment of the proposed systems is implemented. In FIG. 3, a companion user 350 is traveling as a tourist with his daughter 360 (primary device owner) in a foreign city 300. During an outing at a first time (T1), the companion user 350 is pickpocketed by a thief 320, thereby losing his bag 310 (e.g., cash, credit cards, ID cards, etc.) as well as his phone. Moving to FIG. 4, at a subsequent second time (T2) the daughter 360 remembers that she had previously installed, among other apps 420 on her mobile device 410, a version of a companion app 440. She had also, at a time earlier than first time T1, had her father enroll his profile via her locally installed version of the companion app 440. In other words, the father had previously provided some data to the companion app 440 for secure storage. Daughter 360 opens the companion app 440 which can occur with or without a network connection 490 (e.g., see FIG. 2), and—as shown in FIG. 5—can be first asked to enter her credentials before she can authorize a companion to initiate their own access session. This interaction ensures that a companion will not simply take the primary device without the primary device owner's permission and attempt to log into their profile/account without the explicit permission of the primary device owner. In this example, she is asked to provide some biometric authentication factor 510 (e.g., captured via device camera 540) and a knowledge-based authentication factor 520 (e.g., a password). In some embodiments, these can be the same authentication factors for the primary device operating system (e.g., Apple FaceID®, TouchID®, fingerprint scanner, etc.). After she is verified, she is shown options 530 for triggering a companion session. In this case, she is able to select which profile is to be opened because she has had multiple persons enroll with her device. In other embodiments, the companion app 440 can navigate to a main menu or welcome screen in which other settings or selections can be made by the daughter 360.

Figure 6A:
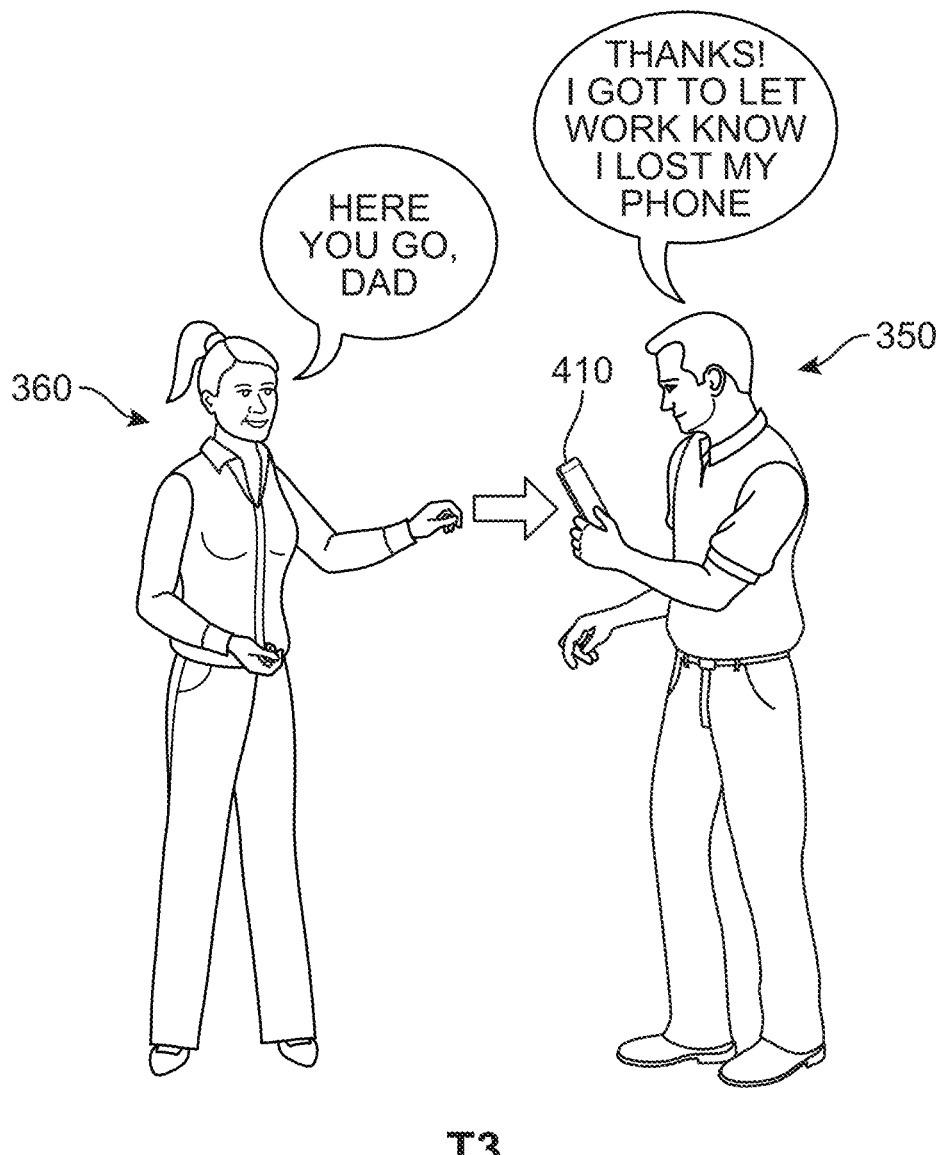
FIGS. 6A and 6B depict an example of the companion of the primary owner providing an authentication factor and then initiating a limited access session on the mobile device, according to an embodiment.
Figure 6B:
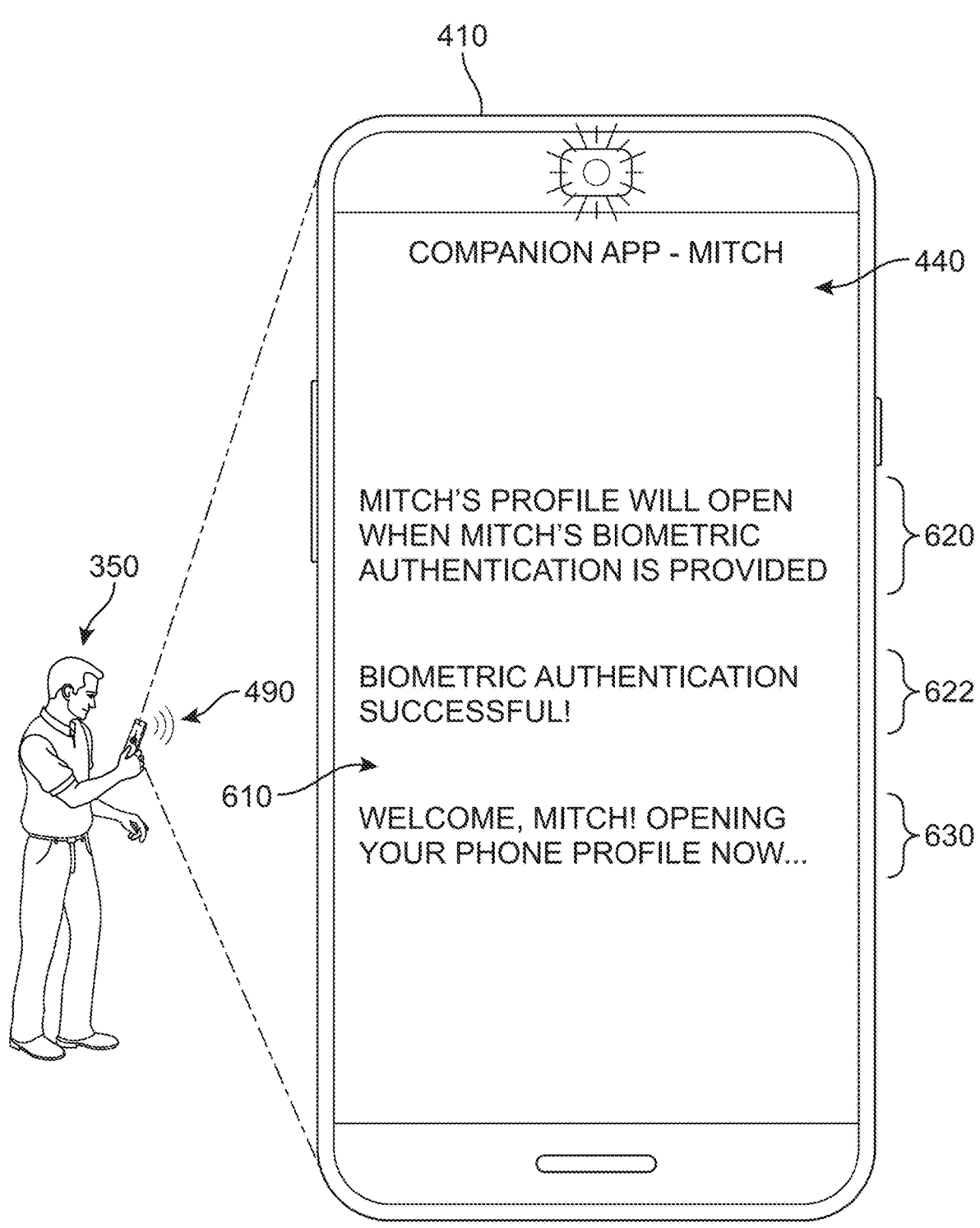

Moving next to FIG. 6A, at a third time (T3) after second time T2, the daughter 360 hands her mobile device 410 ("Here you go, Dad!") to her father as he is the companion user 350 ("Thanks! I got to let work know right away that I lost my phone"). In FIG. 6B, the companion user 350 is shown viewing display 610 of the mobile device 440, which is restricted to what the companion app 440 is allowed to present at this time. For this example, the companion app 440 is limited to obtaining some input from whoever is in possession of the mobile device 410 in order to verify their identity, as represented by an authentication pending alert 620 ("Mitch's profile will open when Mitch's biometric authentication is complete") that can remain on the display 610 (blocking any other use of the mobile device 410) until the requested information is received. The companion user 350 provides his biometric authentication factor, and the system confirms the data was a successful match as a verified alert 622. In response to this event, the companion app 440 authorizes access to the specific resources via the mobile device 410 to which the companion user 350 has been approved and/or for which he has provided information.

Figure 7:
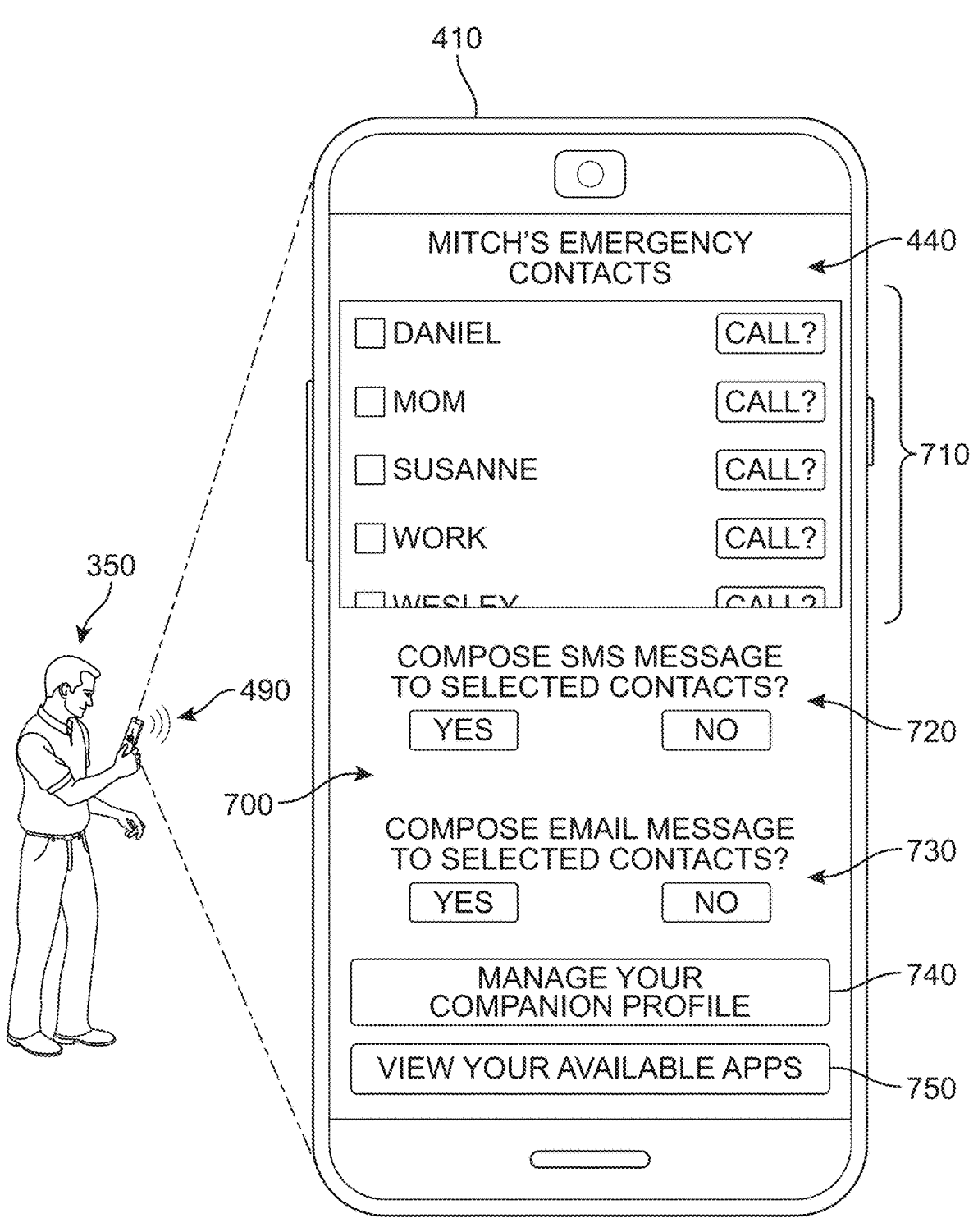
FIGS. 7 and 8 depict examples of some features provided to the companion via the companion access application at the mobile device, according to an embodiment.

An example of this limited access session 700 is depicted in FIG. 7. The companion app 440 has now opened a companion access portal that includes presentation of information and/or options that are typically the most important or critical for users, including their contacts 710. In some embodiments, the companion app 440 can offer selectable quick-options or shortcuts to perform tasks such as a first task 720 to draft/send an SMS/text message to one or more contacts, and a second task 730 to draft/send an email message to one or more contacts. This can allow the companion to quickly inform his network that he is no longer in reach via his own phone, but may be reachable at this new number (which may correspond to his daughter's phone's number, or a virtual number created by the companion app) or at an email address generated by the companion app (e.g., mitch@companion.com). In some embodiments, other options or navigation buttons can be provided, such as a manage option 740 to view/modify/update/manage their companion profile and data, and an apps access option 750 to see the apps that are now available to him. In some embodiments, a terminate option to quickly close or end their limited access session 700 on the mobile device 410 is also shown at all times.

In some embodiments, the limited access session 700 may end when the companion manually ends the session. However, in other embodiments, the session can end after a pre-set time as selected by either the primary owner or the companion. Thus, in some embodiments, the primary owner may request that any companion access sessions run no longer than 10 minutes (or some other custom-selected duration, such as 5 minutes, 30 minutes, one hour, etc.) to ensure they have their device back when they need it. In another example, the companion can request that companion access sessions run no longer than 5 minutes (or some other custom-selected duration, such as 5 minutes, 30 minutes, one hour, etc.) to ensure their information is not inadvertently made available to someone else if the mobile device is somehow grabbed at this time or lost. In still another example, the companion app can require periodic re-authentication events (e.g., every 10 minutes) of the companion in order to continue to provide the services of the limited access session. If someone takes the phone and then tries to continue the companion's session, reauthentication will fail and the companion session will immediately terminate. The phone will also become locked.

Figure 8:
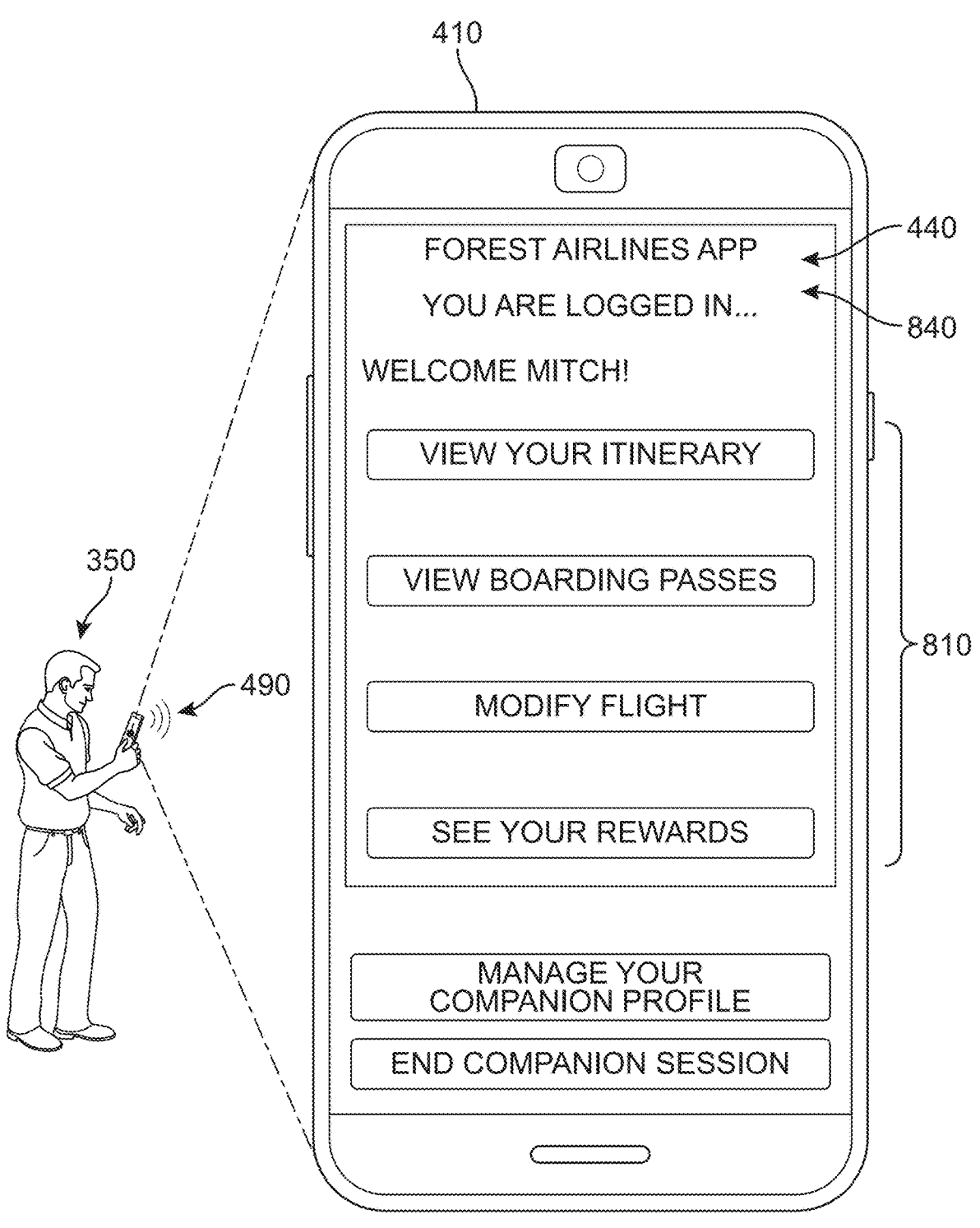
Figure 9A:
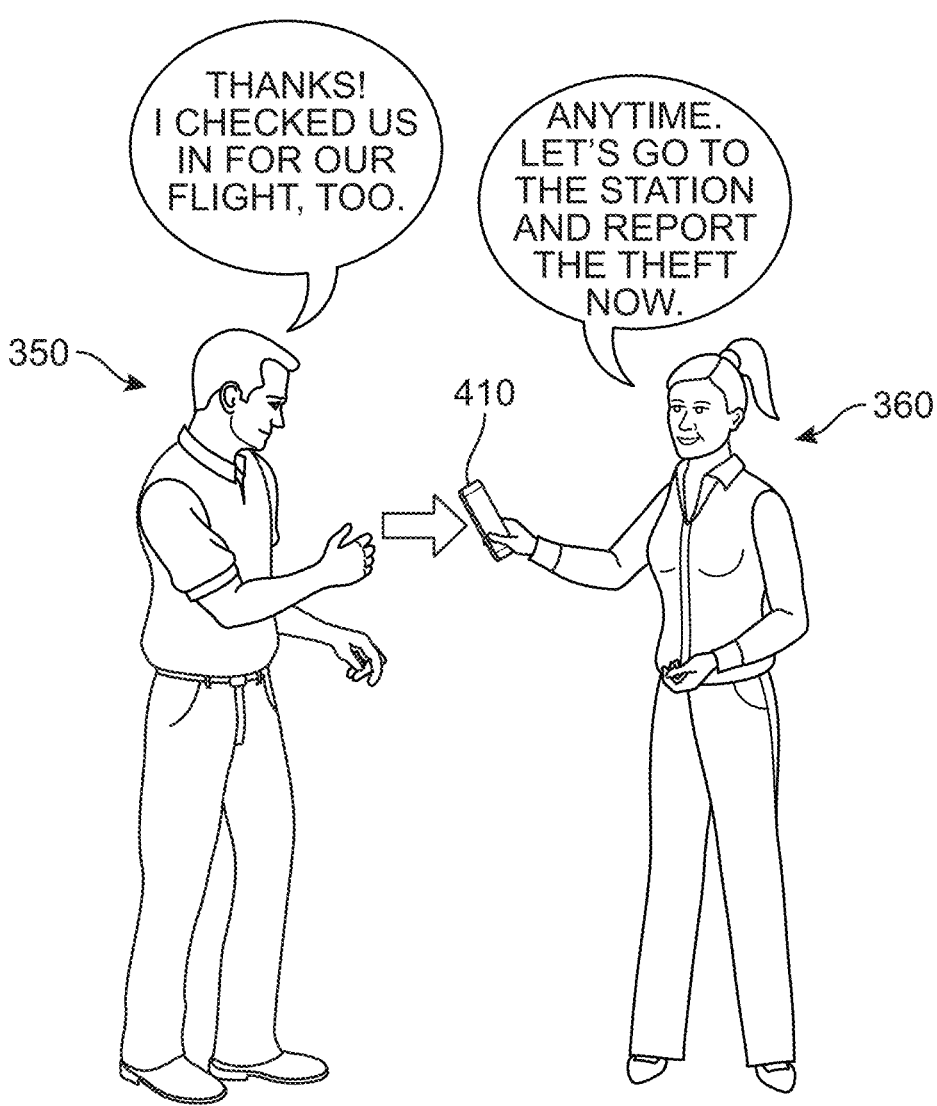
FIGS. 9A and 9B show an example of the mobile device being returned to the primary owner and the reversion to standard access, according to an embodiment.
Figure 9B:
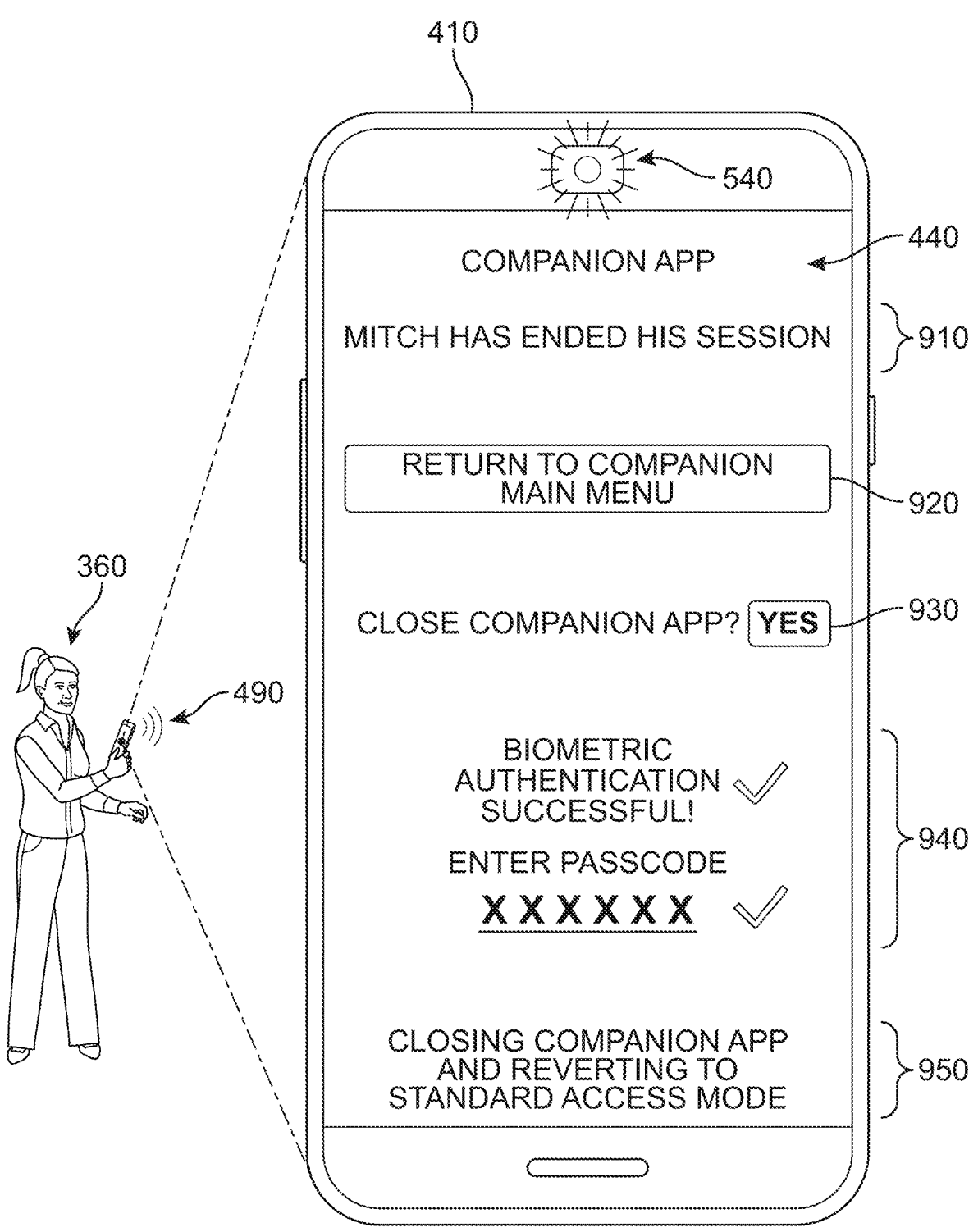

In this example, the companion user 350 accesses his personalized app library, and selects one of his travel apps (e.g., for Forest Airlines), as illustrated in FIG. 8. The companion app 440 then opens a micro app 840 version of the app for the Forest Airlines service and automatically logs him into his Forest Airlines account. From there he is able to view his account-specific options 810 that can be critical for his travels. He completes his desired task and ends his session, so that no one can see his information any longer. Moving to FIG. 9A, at a fourth time (T4), companion user 350 ("Thanks! I checked us in for our flight") passes the mobile device 410 back to the primary owner, daughter 360 ("Anytime. Let's go to the station and report the theft now"). In FIG. 9B, the daughter 360 has taken possession of her mobile device 410. However, the companion app 440 does not immediately allow her to access her normal features, as verification following the transfer of the mobile device 410 must now occur to protect the security of her data. The companion app 440 presents a notification 910 ("Mitch has ended his session"), and a series of options, including a first option 920 to return to the companion app's main menu, and a second option 930 to simply close the companion app 930. Daughter 360 elects to close the app, but the companion app 440 makes the app's termination contingent on her authentication 940. Only when authentication 940 is successful does the companion app 440 present an indication 950 that the app will be closed and the phone will revert to its normal/standard operation or access mode.

FIG. 10 is a flow chart illustrating an embodiment of a computer-implemented method 1000 of providing authorized users limited access to a computing device. The method 1000 includes a first step 1010 of receiving, at a companion access application running on a first computing device and at a first time, a first request to initiate a companion access session on behalf of a first companion and a second step 1020 of blocking, by the companion access application and in response to the first request, access to features or data associated with the first computing device outside of the companion access application in order to protect the data of the device owner. In addition, a third step 1030 includes receiving, at the companion access application and from a first person at a second time after the first time, a first authentication factor and a fourth step 1040 of authenticating, via the companion access application, the first person as the first companion based on the first authentication factor. In addition, a fifth step 1050 includes initiating, by the companion access application, the companion access session in response to both the first request and the first companion's authentication, and a sixth step 1060 includes presenting, via the companion access application, a first set of information associated with the first companion retrieved from a companion repository that may be remotely accessed over a network.

In other embodiments, the method may include additional steps or aspects. In one embodiment, the method also includes automatically continuing to block access to features or data associated with the first computing device outside of the companion access application until a second authentication factor for an owner of the first computing device is received. In some cases, some features within the companion access application can also be blocked if they are directed to options or data not associated with the companion user. In another example, the method further includes presenting, at the companion access application and before the second time, a second request for a second authentication factor associated with an owner of the first computing device in response to receiving the first request, and also presenting, at the companion access application, a third request for the first authentication factor only in cases where the second authentication factor is received and the owner has been authenticated, wherein the third request must be presented before the first authentication factor can be received.

In some embodiments, the method also includes receiving, at the companion access application during an enrollment session performed at a third time prior to the first time, data for the first companion including the first set of information and a record of the first authentication factor, where authentication of the first companion is based on the record (e.g., matching the factors). In one example, the data also includes payment details associated with the first companion that enables, during the companion access session, the use of a mobile payment service via the first computing device that is charged to an account for the first companion (e.g., mobile phone contactless pay options such as Google® Pay, etc. that can be used at POS terminals).

In some embodiments, the method can include automatically terminating the companion access session after a prespecified period of time has passed, the prespecified period having been selected by either the first companion or an owner of the first computing device. In different embodiments, the method also includes automatically terminating, at a third time after the second time, the companion access session, and continuing to block access to features or data associated with the first computing device outside of the companion access application until a second authentication factor for an owner of the first computing device is received. In another example, the method includes automatically wiping the data for the first companion if the first companion fails to initiate any subsequent companion access sessions within a prespecified period of time following the third time.

In some other examples, the method can include steps of presenting, at the companion access application and after a prespecified period following the second time, a second request for the first authentication factor; and automatically terminating the companion access session unless reauthentication of the first companion is successful. In some embodiments, the method can include receiving, at the companion access application during an enrollment session performed at a third time prior to the first time, data for the first companion, where the data is transmitted directly (e.g., over a local network connection) from a second computing device associated with the first companion. In one embodiment, the companion access session includes a micro app corresponding to an app that was installed on the second computing device or otherwise providing specialized subset of features from the original (full) app.

Other methods can also be contemplated within the scope of this disclosure. For example, a computer-implemented method of providing authorized users limited access to a computing device can include a first step of receiving, at a companion access application running on a first computing device and at a first time, a first request to initiate an enrollment session of a first companion, and a second step of automatically blocking, by the companion access application and in response to the first request, standard access to features or data associated with the first computing device outside of the companion access application. The method also includes a third step of receiving, at the companion access application and from the first companion at a second time after the first time, a first authentication factor, and a fourth step of automatically storing the first authentication factor in a record linked to the first companion. Furthermore, the method includes a fifth step of receiving, at the companion access application, a first set of information including one of emergency contacts, payment details, and credentials for a first app, a sixth step of automatically storing the first set of information in the record, and a seventh step of receiving, at the companion access application and from an owner of the first computing device at a third time after the second time, a second authentication factor. In addition, the method includes an eighth step of authenticating, via the companion access application, the owner based on the second authentication factor, and a ninth step of unblocking, in response to the authentication, standard access to features or data associated with the first computing device outside of the companion access application.

In other embodiments, the method may include additional steps or aspects. In one embodiment, the method also includes one or more steps of receiving, at the companion access application and after the third time, a request to initiate a companion access session on behalf of the first companion; receiving, at the companion access application and from a first person, a third authentication factor; authenticating, via the companion access application, the first person as the first companion based on the first authentication factor matching the third authentication factor; automatically initiating, by the companion access application, the companion access session in response to both the first request and the first companion's authentication; and automatically presenting, via the companion access application, the first set of information associated with the first companion.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing authorized users limited access to a computing device, the method comprising:
   receiving, at a companion access application running on a first computing device and at a first time, a first request to initiate a companion access session on behalf of a first companion;
   blocking, by the companion access application and in response to the first request, access to features or data associated with the first computing device outside of the companion access application;
   receiving, at the companion access application and from a first person at a second time after the first time, a first authentication factor;
   authenticating, via the companion access application, the first person as the first companion based on the first authentication factor;
   initiating, by the companion access application, the companion access session in response to both the first request and the first companion's authentication;
   presenting, via the companion access application, a first set of information associated with the first companion retrieved from a companion repository;
   presenting, at the companion access application and before the second time, a second request for a second authentication factor associated with an owner of the first computing device in response to receiving the first request; and
   presenting, at the companion access application, a third request for the first authentication factor only in cases where the second authentication factor is received and the owner has been authenticated, wherein the third request must be presented before the first authentication factor can be received.

2. The method of claim 1, further comprising continuing to block access to features or data associated with the first computing device outside of the companion access application until the second authentication factor is received.

3. The method of claim 1, further comprising receiving, at the companion access application during an enrollment session performed at a third time prior to the first time, data for the first companion including the first set of information and a record of the first authentication factor, wherein authentication of the first companion is based on the record.

4. The method of claim 3, wherein the data also includes payment details associated with the first companion that enables, during the companion access session, the use of a mobile payment service via the first computing device that is charged to an account for the first companion.

5. The method of claim 1, further comprising automatically terminating the companion access session after a prespecified period of time has passed, the prespecified period having been selected by either the first companion or an owner of the first computing device.

6. The method of claim 1, further comprising automatically terminating, at a third time after the second time, the companion access session, and continuing to block access to features or data associated with the first computing device outside of the companion access application until the second authentication factor is received.

7. The method of claim 1, further comprising automatically wiping the data for the first companion if the first companion fails to initiate any subsequent companion access sessions within a prespecified period of time following the third time.

8. The method of claim 1, further comprising:
   presenting, at the companion access application and after a prespecified period following the second time, another request for the first authentication factor; and
   automatically terminating the companion access session unless reauthentication of the first companion is successful.

9. The method of claim 1, further comprising receiving, at the companion access application during an enrollment session performed at a third time prior to the first time, data for the first companion, wherein the data is transmitted from a second computing device associated with the first companion.

10. The method of claim 9, wherein the companion access session includes a micro app corresponding to an app that was installed on the second computing device.

11. A system for providing authorized users limited access to a computing device, the system comprising a processor and machine-readable media including instructions which, when executed by the processor, cause the processor to:

receive, at a companion access application running on a first computing device and at a first time, a first request to initiate a companion access session on behalf of a first companion;

block, by the companion access application and in response to the first request, access to features or data associated with the first computing device outside of the companion access application;

receive, at the companion access application and from a first person at a second time after the first time, a first authentication factor;

authenticate, via the companion access application, the first person as the first companion based on the first authentication factor;

initiate, by the companion access application, the companion access session in response to both the first request and the first companion's authentication;

present, via the companion access application, a first set of information associated with the first companion retrieved from a companion repository;

presenting, at the companion access application and before the second time, a second request for a second authentication factor associated with an owner of the first computing device in response to receiving the first request; and presenting, at the companion access application, a third request for the first authentication factor only in cases where the second authentication factor is received and the owner has been authenticated, wherein the third request must be presented before the first authentication factor can be received.

12. The system of claim 11, wherein the instructions further cause the processor to continue to block access to features or data associated with the first computing device outside of the companion access application until the second authentication factor is received.

13. The system of claim 11, wherein the instructions further cause the processor to receive, at the companion access application during an enrollment session performed at a third time prior to the first time, data for the first companion including the first set of information and a record of the first authentication factor, wherein authentication of the first companion is based on the record.

14. The system of claim 13, wherein the data also includes payment details associated with the first companion that enables, during the companion access session, the use of a mobile payment service via the first computing device that is charged to an account for the first companion.

15. The system of claim 11, wherein the instructions further cause the processor to automatically terminate the companion access session after a prespecified period of time has passed, the prespecified period having been selected by either the first companion or an owner of the first computing device.

16. The system of claim 11, wherein the instructions further cause the processor to automatically terminate, at a third time after the second time, the companion access session, and continuing to block access to features or data associated with the first computing device outside of the companion access application until the second authentication factor is received.

17. The system of claim 11, wherein the instructions further cause the processor to automatically wipe the data for the first companion if the first companion fails to initiate any subsequent companion access sessions within a prespecified period of time following the third time.

18. The system of claim 11, wherein the instructions further cause the processor to:

present, at the companion access application and after a prespecified period following the second time, another request for the first authentication factor; and automatically terminate the companion access session unless reauthentication of the first companion is successful.

19. The system of claim 11, wherein the instructions further cause the processor to receive, at the companion access application during an enrollment session performed at a third time prior to the first time, data for the first companion, wherein the data is transmitted from a second computing device associated with the first companion.

20. The system of claim 19, wherein the companion access session includes a micro app corresponding to an app that was installed on the second computing device.

* * * * *